United States Patent
Waki et al.

(10) Patent No.: US 10,745,015 B2
(45) Date of Patent: Aug. 18, 2020

(54) POWER TRANSMISSION SYSTEM AND ATTENUATION MECHANISM

(71) Applicant: EXEDY Corporation, Neyagawa-shi, Osaka (JP)

(72) Inventors: Katsuaki Waki, Neyagawa (JP); Kenji Kitada, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/413,428

(22) Filed: May 15, 2019

(65) Prior Publication Data

US 2020/0023851 A1 Jan. 23, 2020

(30) Foreign Application Priority Data

Jul. 17, 2018 (JP) .................. 2018-133814

(51) Int. Cl.
*B60W 30/20* (2006.01)
*B60K 6/36* (2007.10)
*F16F 15/14* (2006.01)
*F16H 61/30* (2006.01)

(52) U.S. Cl.
CPC .............. *B60W 30/20* (2013.01); *B60K 6/36* (2013.01); *F16F 15/1442* (2013.01); *F16H 2061/302* (2013.01)

(58) Field of Classification Search
CPC ...... B60W 30/20; B60K 6/36; F16F 15/1442; F16H 2061/302
USPC ...................................................... 123/192.1
See application file for complete search history.

(56) References Cited

U.S. PATENT DOCUMENTS

| 2,152,710 | A | 4/1939 | Schwaiger | |
|---|---|---|---|---|
| 2007/0278029 | A1* | 12/2007 | Sugiyama | B60K 6/405 180/300 |
| 2010/0320769 | A1* | 12/2010 | Miranda | F03D 15/00 290/55 |
| 2013/0288854 | A1* | 10/2013 | Kobayashi | B60W 30/20 477/5 |

(Continued)

FOREIGN PATENT DOCUMENTS

| JP | 2007-320494 A | 12/2007 |
|---|---|---|
| JP | 2012-087899 A | 5/2012 |
| WO | 2010/050620 A1 | 5/2010 |

OTHER PUBLICATIONS

Extended European Search Report dated Jul. 25, 2019 for corresponding EP Application No. 19178346.3, 7 pp.

*Primary Examiner* — Joseph J Dallo
*Assistant Examiner* — Yi-Kai Wang
(74) *Attorney, Agent, or Firm* — United IP Counselors, LLC (57) ABSTRACT

A power transmission system and an attenuation mechanism are disclosed. A power transmission system includes an electric motor, a drive wheel, a transmission shaft and an attenuation mechanism. The transmission shaft transmits a torque between the electric motor and the drive wheel. The attenuation mechanism is attached to the transmission shaft. The attenuation mechanism includes a support member and an inertia member. The support member is attached to the transmission shaft. The inertia member is disposed to be rotatable relative to the transmission shaft. The inertia member is engaged with the support member by friction.

15 Claims, 4 Drawing Sheets (56) References Cited

U.S. PATENT DOCUMENTS

| | | | | |
|---|---|---|---|---|
| 2013/0310184 A1* | 11/2013 | Takenaka | ............... | F16D 3/12 |
| | | | | 464/68.4 |
| 2015/0291175 A1* | 10/2015 | Harada | ............... | B60W 20/17 |
| | | | | 701/22 |
| 2016/0052379 A1* | 2/2016 | Inoue | ............... | B60K 6/387 |
| | | | | 74/661 |

\* cited by examiner

FIG. 8 ns in torque from the drive wheel can be inhibited by attenuation due to friction. Because of this, unlike a configuration using a dynamic damper, it is possible to omit installation of a torsion spring in the present invention. Hence, the entire device can be made more compact and can be produced with a smaller number of components in the present configuration than in the configuration using the dynamic damper. Furthermore, unlike a configuration using a torque limiter, a friction torque required to be generated by the attenuation mechanism is small in the present invention. Hence, the entire device can be produced with a smaller outer diameter and can be thereby made more compact in the present invention than in the configuration using the torque limiter. Consequently, in the present invention, it is possible to inhibit intense fluctuations in torque from the drive wheel without increasing an installation space in an electric car or a high-power hybrid car. On the other hand, when fluctuations in torque from the drive wheel are small, the inertia member is unitarily rotated with the support member while being engaged by friction therewith. Because of this, it is possible to prevent loss of torque transmission between the electric motor and the drive wheel. It should be noted that engagement by friction between the inertia member and the support member is conceptualized as encompassing not only a condition that the inertia member and the support member are engaged by friction with each other while making direct contact with each other but also a condition that the inertia member and the support member are engaged by viscosity with each other through a viscous fluid such as oil provided therebetween.

POWER TRANSMISSION SYSTEM AND ATTENUATION MECHANISM

CROSS-REFERENCE TO RELATED APPLICATIONS

This application claims priority to Japanese Patent Application No. 2018-133814, filed Jul. 17, 2018. The contents of that application are incorporated by reference herein in their entirety.

TECHNICAL FIELD

The present invention relates to a power transmission system and an attenuation mechanism.

BACKGROUND ART

As a type of vehicle using an engine as a drive source, vehicles equipped with an attenuation mechanism have been known so far. For example, Japan Laid-open Patent Application Publication No. 2007-320494 describes a practical example that a dynamic damper is provided for inhibiting resonance caused by vibration of a drive source.

In electric cars or high-power hybrid cars, a motor has a large inertia, whereby chances are that intense torque fluctuations occur due to input from drive wheels in traveling a winding road or in escaping from a low-μ road. There is a risk that a drive system is damaged or broken by the intense torque fluctuations. Hence, it is required to inhibit the intense torque fluctuations. For example, attaching a dynamic damper, a torque limiter or so forth is a countermeasure assumable as means for inhibiting the intense torque fluctuations.

However, in attachment of the dynamic damper as a countermeasure, a large torsion angle is required because a frequency inputted from a winding road is low in general, whereby it is concerned that the entire device is excessively increased in size. On the other hand, in attachment of the torque limiter as a countermeasure, a transmission torque is required to be greater than or equal to a drive torque, whereby it is concerned as well that the entire device is excessively increased in size. Thus, these countermeasures have a drawback that increase in size of the entire device inevitably results in increase in installation space.

In view of the above, it is an object of the present invention to provide a power transmission system and an attenuation mechanism, both of which can inhibit intense fluctuations in torque inputted thereto from a drive wheel without increasing an installation space.

BRIEF SUMMARY

A power transmission system according to a first aspect of the present invention includes an electric motor, a drive wheel, a transmission shaft and an attenuation mechanism. The transmission shaft transmits a torque between the electric motor and the drive wheel. The attenuation mechanism is attached to the transmission shaft. The attenuation mechanism includes a support member and an inertia member. The support member is attached to the transmission shaft. The inertia member is disposed to be rotatable relative to the transmission shaft. The inertia member is engaged with the support member by friction.

According to the present configuration, when fluctuations in torque from the drive wheel are large, the inertia member is rotated relative to the support member, while being engaged by friction therewith. As a result, intense fluctuations in torque from the drive wheel can be inhibited by attenuation due to friction. Because of this, unlike a configuration using a dynamic damper, it is possible to omit installation of a torsion spring in the present invention. Hence, the entire device can be made more compact and can be produced with a smaller number of components in the present configuration than in the configuration using the dynamic damper. Furthermore, unlike a configuration using a torque limiter, a friction torque required to be generated by the attenuation mechanism is small in the present invention. Hence, the entire device can be produced with a smaller outer diameter and can be thereby made more compact in the present invention than in the configuration using the torque limiter. Consequently, in the present invention, it is possible to inhibit intense fluctuations in torque from the drive wheel without increasing an installation space in an electric car or a high-power hybrid car. On the other hand, when fluctuations in torque from the drive wheel are small, the inertia member is unitarily rotated with the support member while being engaged by friction therewith. Because of this, it is possible to prevent loss of torque transmission between the electric motor and the drive wheel. It should be noted that engagement by friction between the inertia member and the support member is conceptualized as encompassing not only a condition that the inertia member and the support member are engaged by friction with each other while making direct contact with each other but also a condition that the inertia member and the support member are engaged by viscosity with each other through a viscous fluid such as oil provided therebetween.

Preferably, the power transmission system further includes a gearbox or reducer disposed between the electric motor and the drive wheel.

Preferably, the attenuation mechanism is disposed between the drive wheel and the gearbox or reducer.

Preferably, the attenuation mechanism is disposed between the electric motor and the gearbox or reducer.

Preferably, the transmission shaft includes a driveshaft. The attenuation mechanism is attached to the driveshaft.

Preferably, the transmission shaft includes a propeller shaft. The attenuation mechanism is attached to the propeller shaft.

Preferably, the attenuation mechanism further includes a friction material. The friction material is attached to the support member or the inertia member. Additionally, the inertia member is engaged with the support member by friction through the friction material. Thus, the attenuation mechanism further includes the friction material, whereby a friction coefficient can be easily adjusted in a frictionally engaged part between the support member and the inertia member, and can be enhanced in stability.

Preferably, the inertia member is engaged with the support member by friction while making direct contact therewith. According to this configuration, it is possible to omit installation of a friction material.

Preferably, the attenuation mechanism further includes urging mechanism. The urging mechanism urges the inertia member and the support member so as to make the inertia member and the support member approach each other. It should be noted that the urging mechanism can urge the inertia member toward the support member, or alternatively, can urge the support member toward the inertia member.

Preferably, the attenuation mechanism includes an urging member as the urging mechanism. The urging member is provided separately from the inertia member and the support member. According to this configuration, it is possible to easily adjust an urging force applied in urge for making the inertia member and the support member approach each other. Besides, minute setting of the urging force is made easy.

Preferably, one of the inertia member and the support member includes an elastic portion as the urging mechanism. The elastic portion presses the other of the inertia member and the support member while being elastically deformed. According to this configuration, it is possible to omit installation of an urging member for making the inertia member and the support member approach each other.

Preferably, a frictionally engaged part between the inertia member and the support member is disposed radially outside the urging mechanism. According to this configuration, the frictionally engaged part between the inertia member and the support member can be made large in area. Because of this, the elastic portion can be reduced in elastic force required for engagement by friction. As a result, abrasion can be inhibited in the frictionally engaged part, and occurrence of slip can be prevented therein when engagement by friction is intended.

Preferably, the support member includes an attachment hub and a clamp portion. The attachment hub is attached to the transmission shaft. The clamp portion is attached to the attachment hub. Additionally, the clamp portion interposes and holds the inertia member together with the attachment hub therebetween. According to this configuration, the inertia member can be simplified in structure. As a result, the inertia amount of the inertia member can be easily adjusted, and can be easily increased as well.

An attenuation mechanism according to a second aspect of the present invention is disposed between an electric motor and a drive wheel, and is attached to a transmission shaft transmitting a torque. The attenuation mechanism includes a support member and an inertia member. The support member is attached to the transmission shaft. The inertia member is disposed to be rotatable relative to the transmission shaft, and is engaged with the support member by friction.

Overall, according to the present invention, intense fluctuations in torque from a drive wheel can be inhibited without increasing an installation space.

DETAILED DESCRIPTION

A power transmission system according to a preferred embodiment of the present invention will be explained with reference to the attached drawings.

Figure 1:
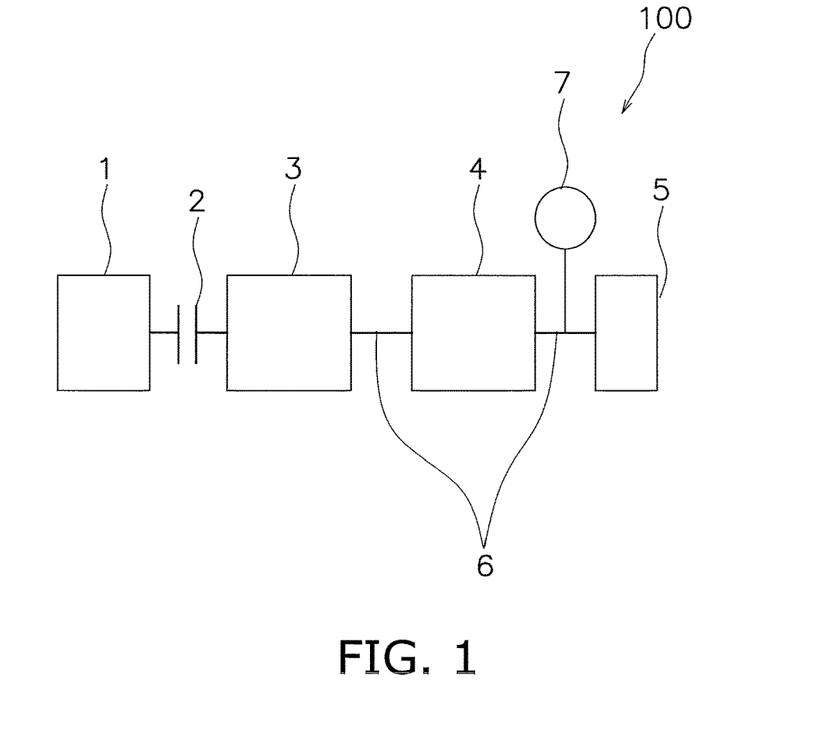
FIG. 1 is a block diagram of a power transmission system.

As shown in FIG. 1, a power transmission system 100 is applied to a hybrid car. The power transmission system 100 includes an engine 1, a clutch 2, an electric motor 3, a transmission 4 (exemplary gearbox), a drive wheel 5, a transmission shaft 6 and an attenuation mechanism 7. It should be noted that the power transmission system 100 does not include any clutch between the electric motor 3 and the drive wheel 5.

The electric motor 3 operates as a drive source. The engine 1 can operate as a drive source generating electricity for the electric motor 3 or can operate as a drive source for driving the drive wheel 5. In other words, the hybrid car, to which the power transmission system 100 according to the present preferred embodiment is applied, can be of any of a series type, a parallel type and a split type.

The clutch 2 is disposed between the engine 1 and the electric motor 3. The clutch 2 transmits a torque between the engine 1 and the electric motor 3, while being capable of blocking transmission of the torque therebetween. The transmission 4 is disposed between the electric motor 3 and the drive wheel 5. The transmission 4 transmits rotation of the electric motor 3 to the drive wheel 5, while the rotation is increased or reduced in speed.

The transmission shaft 6 transmits the torque between the electric motor 3 and the drive wheel 5. The transmission shaft 6 includes, for instance, a driveshaft. Alternatively, the transmission shaft 6 can include a propeller shaft. Yet alternatively, the transmission shaft 6 is not limited to a shaft transmitting the torque between the respective members, and is conceptualized as encompassing not only the shaft but also other members, for instance, a member disposed in a gearbox or reducer (the transmission 4) so as to transmit a torque.

The attenuation mechanism 7 is attached to the transmission shaft 6. For example, the attenuation mechanism 7 is attached to the driveshaft. It should be noted that when the transmission shaft 6 includes the propeller shaft, the attenuation mechanism 7 can be attached to the propeller shaft. Alternatively, the attenuation mechanism 7 can be attached to the member disposed in the gearbox or reducer (the transmission 4) so as to transmit a torque.

The attenuation mechanism 7 is disposed between the electric motor 3 and the drive wheel 5. Detailedly, the attenuation mechanism 7 is disposed between the transmission 4 and the drive wheel 5.

When fluctuations in torque inputted to the attenuation mechanism 7 from the drive wheel 5 has a predetermined value or greater, the attenuation mechanism 7 is configured to attenuate the torque fluctuations. On the other hand, when fluctuations in torque inputted to the attenuation mechanism 7 from the drive wheel 5 has less than the predetermined value, the attenuation mechanism 7 is configured not to attenuate the torque fluctuations.

Figure 2:
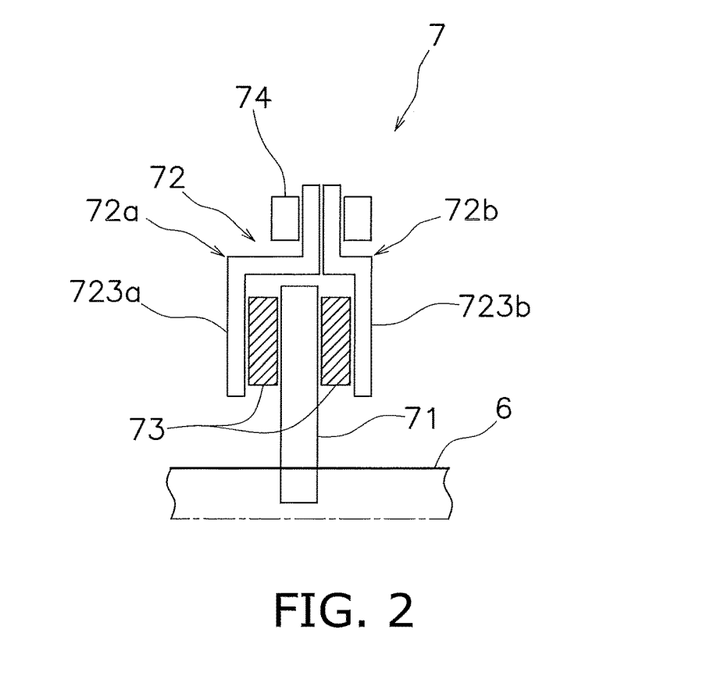
FIG. 2 is a schematic diagram of an attenuation mechanism.

As shown in FIG. 2, the attenuation mechanism 7 includes a support member 71, an inertia member 72 and friction materials 73. The support member 71 is attached to the transmission shaft 6, and is unitarily rotated therewith. For example, the support member 71 is attached to the transmission shaft 6 by rivet coupling, key coupling or so forth. Preferably, the support member 71 is integrally attached to the transmission shaft 6.

The inertia member 72 is disposed to be rotatable relative to the transmission shaft 6. Additionally, the inertia member 72 is engaged with the support member 71 by friction. Detailedly, the inertia member 72 is engaged with the support member 71 by friction through the friction materials 73. For example, the friction materials 73 are attached to the support member 71. A pair of the friction materials 73 each having an annular shape is attached to the both surfaces of the support member 71 so as to interpose the outer peripheral end of the support member 71 therebetween.

The inertia member 72 is attached to the support member 71 so as to interpose therein the support member 71 to which the pair of friction materials 73 is attached. Detailedly, the inertia member 72 includes a first inertia portion 72a and a second inertia portion 72b. Additionally, the first and second inertia portions 72a and 72b interpose therebetween the support member 71 to which the pair of friction materials 73 is attached. The first and second inertia portions 72a and 72b are fixed to each other by at least one rivet 74 attached to the outer peripheral ends thereof.

The first inertia portion 72a includes an elastic portion 723a, while the second inertia portion 72b includes an elastic portion 723b. The elastic portions 723a and 723b press the support member 71 through the friction materials 73, while being elastically deformed. In other words, the inertia member 72 is urged toward the support member 71 by the elastic force thereof so as to interpose the support member 71 therein. Because of this, it is possible to omit installation of an urging member for urging the first and second inertia portions 72a and 72b toward the support member 71.

In the attenuation mechanism 7 configured as described above, when fluctuations in torque inputted thereto from the drive wheel 5 do not have the predetermined value or greater, the inertia member 72 is unitarily rotated with the support member 71 while being engaged by friction therewith.

On the other hand, when fluctuations in torque inputted thereto from the drive wheel 5 has the predetermined value or greater, the inertia member 72 is rotated relative to the support member 71 while making contact by friction therewith. In other words, the inertia member 72 is rotated relative to the support member 71, while friction resistances are applied thereto from the friction materials 73. At this time, torque fluctuations are attenuated by an attenuation force of friction between the inertia member 72 and the support member 71. It should be noted that in the present preferred embodiment, the support member 71 and the inertia member 72 are engaged by friction with each other through the friction materials 73 without making direct contact with each other. Thus, the attenuation mechanism 7 includes the friction materials 73. Therefore, a friction coefficient can be easily adjusted and can be enhanced in stability.

MODIFICATIONS

One preferred embodiment of the present invention has been explained above. However, the present invention is not limited to the aforementioned preferred embodiment, and a variety of changes can be made without departing from the gist of the present invention.

Modification 1

Figure 3:
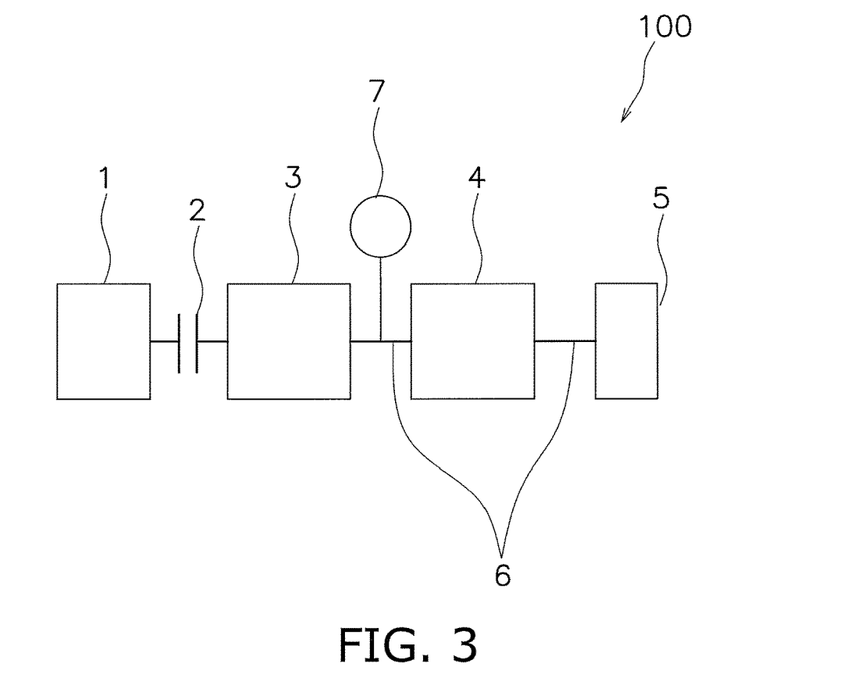
FIG. 3 is a block diagram of a power transmission system according to a modification.
Figure 4:
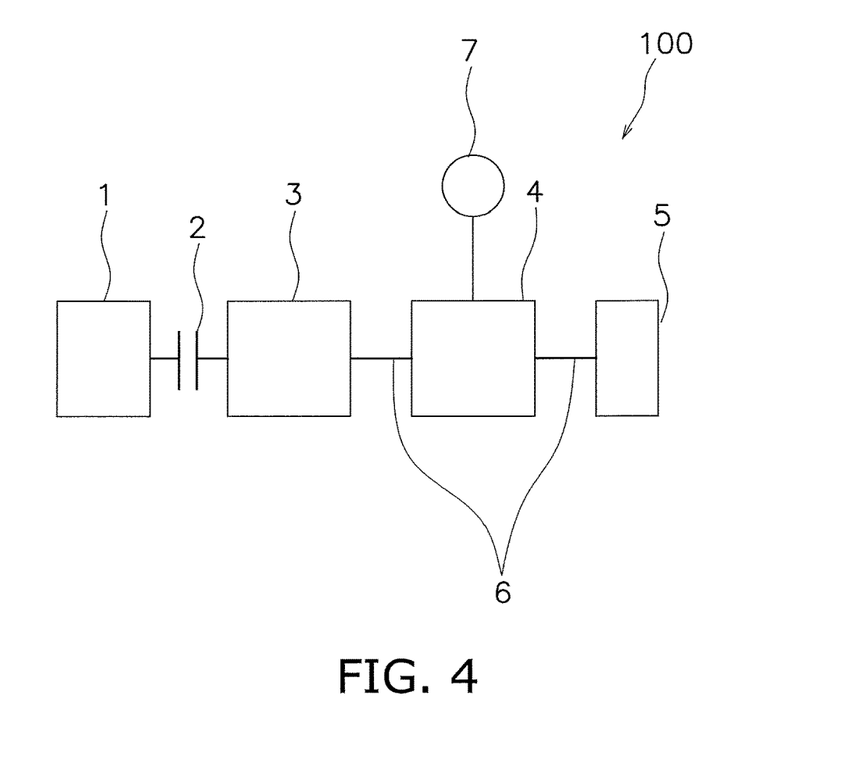
FIG. 4 is a block diagram of another power transmission system according to the modification.

In the aforementioned preferred embodiment, the attenuation mechanism 7 is disposed between the transmission 4 and the drive wheel 5. However, the layout of the attenuation mechanism 7 is not limited to this. For example, as shown in FIG. 3, the attenuation mechanism 7 can be disposed between the electric motor 3 and the transmission 4. Detailedly, the attenuation mechanism 7 can be attached to an input shaft of the transmission 4. It should be noted that the input shaft of the transmission 4 is part of the transmission shaft 6. Alternatively, as shown in FIG. 4, the attenuation mechanism 7 can be attached to a member that is disposed in the gearbox or reducer (the transmission 4) so as to transmit a torque.

Modification 2

Figure 5:
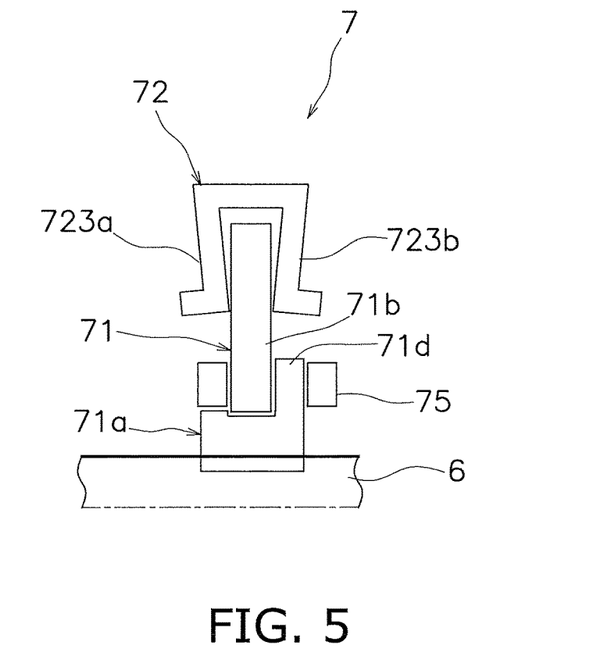
FIG. 5 is a schematic diagram of an attenuation mechanism according to the modification and another modification.

In the aforementioned preferred embodiment, the support member 71 of the attenuation mechanism 7 is formed by a single plate. However, the configuration of the support member 71 is not limited to this. For example, as shown in FIG. 5, the support member 71 can be composed of two or more members. Detailedly, the support member 71 includes an attachment hub 71a and a plate portion 71b. The plate portion 71b is attached to a flange portion 71d of the attachment hub 71a by, for instance, at least one rivet 75.

Modification 3

In the aforementioned preferred embodiment, the inertia member 72 is engaged with the support member 71 by friction through the friction materials 73. However, the configuration that the inertia member 72 is engaged with the support member 71 by friction is not limited to this. For example, as shown in FIG. 5, the inertia member 72 can be engaged by friction with the support member 71, while making direct contact therewith. According to this configuration, it is possible to omit installation of the friction materials.

On the other hand, the inertia member 72 includes the elastic portions 723a and 723b. The elastic portions 723a and 723b press the support member 71 while being elastically deformed. In other words, the inertia member 72 is urged toward the support member 71 by the elastic force thereof so as to interpose the support member 71 therein. Because of this, it is possible to omit installation of an urging member for urging the inertia member 72 toward the support member 71 and installation of a member for supporting the urging member.

Modification 4

Figure 6:
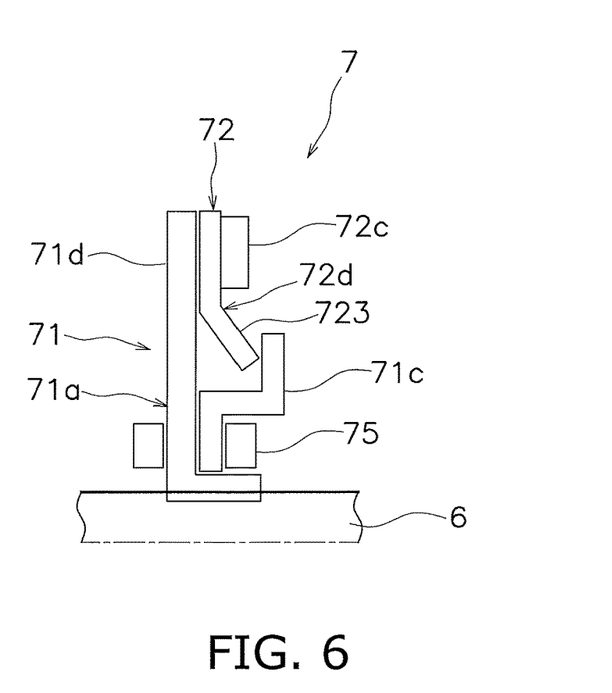
FIG. 6 is a schematic diagram of an attenuation mechanism according to yet another modification.

In the aforementioned preferred embodiment, the inertia member 72 interposes the support member 71 therein. However, the interposing configuration between the inertia member 72 and the support member 71 is not limited to this. For example, as shown in FIG. 6, the support member 71 can interpose the inertia member 72 therein. In this case, for instance, the support member 71 includes the attachment hub 71a and a clamp portion 71c. The attachment hub 71a is attached to the transmission shaft 6. The clamp portion 71c is attached to the flange portion 71d of the attachment hub 71a by the at least one rivet 75. The clamp portion 71c interposes and holds the inertia member 72 together with the attachment hub 71a therebetween. According to this configuration, the inertia member 72 can be simplified in structure. Hence, the inertia amount can be easily adjusted, and can be easily increased as well.

Additionally, the inertia member 72 includes an inertia body 72c and a disc spring plate 72d. The inertia body 72c is attached to the outer peripheral end of the disc spring plate 72d. Detailedly, the inner peripheral end of the disc spring plate 72d functions as a disc spring, and is interposed between the clamp portion 71c and the flange portion 71d of the attachment hub 71a, while being compressed therebetween. In other words, the inner peripheral end of the disc spring plate 72d forms the aforementioned elastic portion 723, and presses the support member 71 while being elastically deformed. According to this configuration, it is possible to omit installation of an urging member for urging the inertia member 72 toward the support member 71.

Additionally, the outer peripheral end of the flange portion 71d of the support member 71 and that of the disc spring plate 72d are engaged by friction with each other. Thus, a frictionally engaged part between the support member 71 and the inertia member 72 is disposed radially outside the elastic portion 723. According to this configuration, the frictionally engaged part can be made large in area. Hence, the elastic portion 723 can be reduced in elastic force required for engagement by friction. As a result, abrasion can be inhibited in the frictionally engaged part, and occurrence of slip can be prevented therein when engagement by friction is intended. Additionally, the support member 71 and the inertia member 72 are engaged by friction while making direct contact with each other. Hence, it is possible to omit installation of a friction material.

Modification 5

Figure 7:
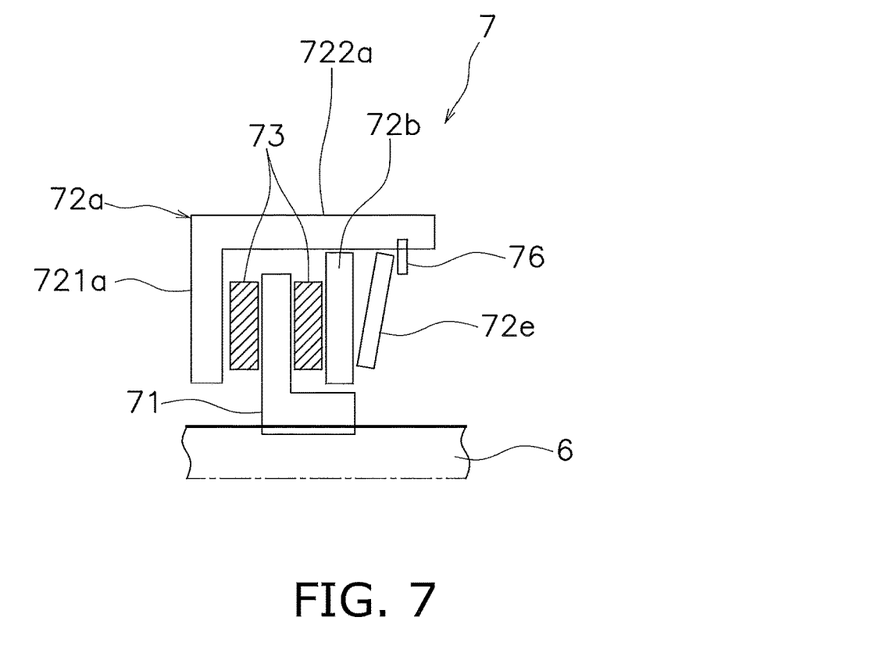
FIG. 7 is a schematic diagram of an attenuation mechanism according to further yet another modification.

In the aforementioned preferred embodiment, the inertia member 72 is urged against the support member 71 by the elastic force thereof. However, the urging configuration between the inertia member 72 and the support member 71 is not limited to this. For example, as shown in FIG. 7, the attenuation mechanism 7 can further include an urging member 72e. The urging member 72e is, for instance, a disc spring. The urging member 72e urges the inertia member 72 and the support member 71 so as to make the both approach each other.

Detailedly, the inertia member 72 includes the first and second inertia portions 72a and 72b disposed to interpose the support member 71 therebetween. The urging member 72e urges the first and second inertia portions 72a and 72b so as to make the both approach each other. In other words, the urging member 72e urges the first and second inertia portions 72a and 72b so as to make the both approach the support member 71. As a result, the support member 71, to which the friction materials 73 are attached, can be interposed at the outer peripheral end thereof between the first and second inertia portions 72a and 72b. It should be noted that the first inertia portion 72a includes a disc portion 721a and a cylindrical portion 722a axially extending from the outer peripheral end of the disc portion 721a. Additionally, a retaining ring 76 is attached to the inner peripheral surface of the cylindrical portion 722a of the first inertia portion 72a. The retaining ring 76 restricts axial movement of the urging member (disc spring) 72e.

According to this configuration, the attenuation mechanism 7 includes the urging member 72e provided as a discrete member. Hence, it is possible to easily adjust an urging force applied in urge for making the inertia member 72 and the support member 71 approach each other. Besides, minute setting of the urging force is made easy.

Modification 6

Figure 8:
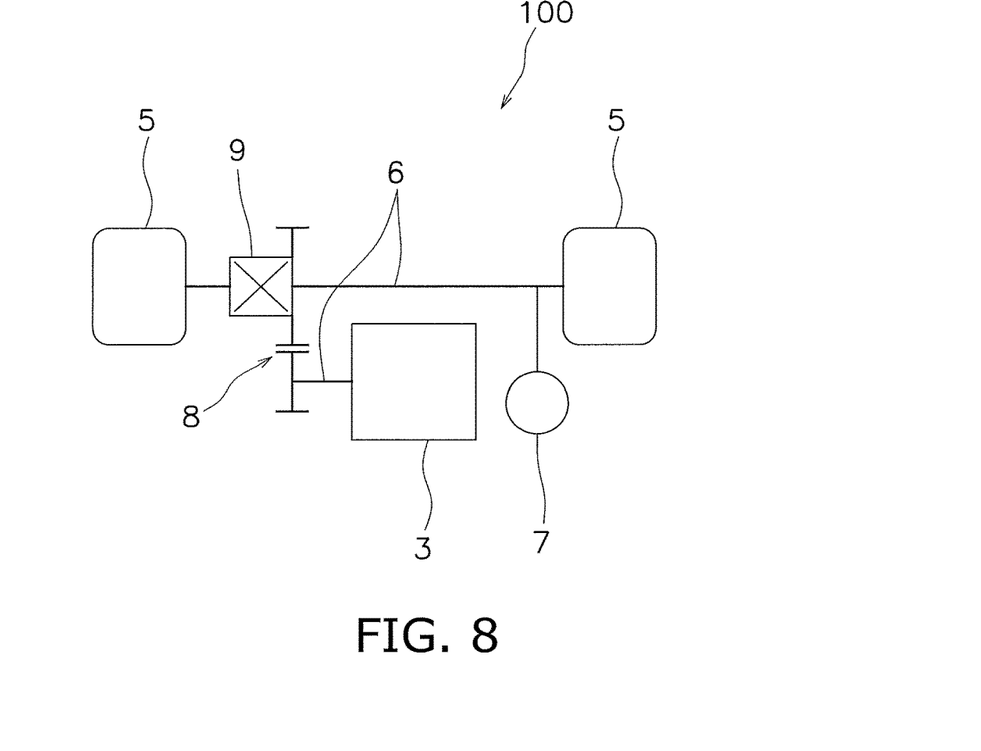
FIG. 8 is a block diagram of a power transmission system according to still further yet another modification.

In the aforementioned preferred embodiment, the power transmission system according to the present invention has been applied to the hybrid car. However, the power transmission system according to the present invention is applicable to an electric car as well. For example, as shown in FIG. 8, the power transmission system 100 applied to the electric car includes the electric motor 3, a reducer 8, a differential gear 9, the drive wheel 5, the transmission shaft 6 and the attenuation mechanism 7. It should be noted that the configurations of the electric motor 3, the drive wheel 5, the transmission shaft 6 and the attenuation mechanism 7 are similar to those in the aforementioned preferred embodiment. Hence, the detailed explanation thereof will be hereinafter omitted.

The attenuation mechanism 7 is disposed between the reducer 8 and the drive wheel 5. Detailedly, the attenuation mechanism 7 is disposed between the differential gear 9 and the drive wheel 5. It should be noted that the attenuation mechanism 7 can be disposed between the electric motor 3 and the reducer 8.

REFERENCE SIGNS LIST

3: Electric motor
5: Drive wheel
6: Transmission shaft
7: Attenuation mechanism
8: Reducer
71: Support member
72: Inertia member
100: Power transmission system

What is claimed is:

1. A power transmission system comprising:
an electric motor;
a drive wheel;
a transmission shaft configured to transmit a torque between the electric motor and the drive wheel; and
an attenuation mechanism attached to the transmission shaft, wherein
the attenuation mechanism includes
a support member attached to the transmission shaft, and
an inertia member disposed to be rotatable relative to the transmission shaft, the inertia member engaged with the support member to attenuate torque fluctuations due to friction alone.

2. The power transmission system according to claim 1, further comprising:
a gearbox or reducer disposed between the electric motor and the drive wheel.

3. The power transmission system according to claim 2, wherein the attenuation mechanism is disposed between the drive wheel and the gearbox or reducer.

4. The power transmission system according to claim 2, wherein the attenuation mechanism is disposed between the electric motor and the gearbox or reducer.

5. The power transmission system according to claim 1, wherein
the transmission shaft includes a driveshaft, and
the attenuation mechanism is attached to the driveshaft.

6. The power transmission system according to claim 1, wherein
the transmission shaft includes a propeller shaft, and
the attenuation mechanism is attached to the propeller shaft.

7. The power transmission system according to claim 1, wherein
the attenuation mechanism further includes a friction material attached to the support member or the inertia member, and
the inertia member is engaged with the support member by friction through the friction material.

8. The power transmission system according to claim 1, wherein the inertia member is engaged with the support member by friction while making direct contact therewith.

9. The power transmission system according to claim 1, wherein the attenuation mechanism further includes urging mechanism configured to urge the inertia member and the support member so as to make the inertia member and the support member approach each other.

10. The power transmission system according to claim 9, wherein the attenuation mechanism includes an urging member as the urging mechanism, the urging member provided separately from the inertia member and the support member.

11. The power transmission system according to claim 9, wherein one of the inertia member and the support member includes an elastic portion as the urging mechanism, the elastic portion pressing the other of the inertia member and the support member while being elastically deformed.

12. The power transmission system according to claim 9, wherein a frictionally engaged part between the inertia member and the support member is disposed radially outside the urging mechanism.

13. The power transmission system according to claim 1, wherein the support member includes an attachment hub and a clamp portion, the attachment hub attached to the transmission shaft, the clamp portion attached to the attachment hub, the clamp portion interposing and holding the inertia member together with the attachment hub therebetween.

14. An attenuation mechanism for attachment to a transmission shaft transmitting a torque between an electric motor and a drive wheel, the attenuation mechanism comprising:
a support member configured to be attached to the transmission shaft; and
an inertia member disposed to be rotatable relative to the transmission shaft, the inertia member engaged with the support member to attenuate torque fluctuations due to friction alone.

15. A power transmission system comprising:
an electric motor;
a drive wheel;
a transmission shaft configured to transmit a torque between the electric motor and the drive wheel; and
an attenuation mechanism attached to the transmission shaft, the attenuation mechanism including
a support member attached to the transmission shaft, and
an inertia member disposed to be rotatable relative to the transmission shaft, the inertia member engaged with the support member by friction;
wherein the attenuation mechanism is disposed separately from a torque transmission path between the electric motor and the drive wheel.

* * * * *